May 19, 1970  P. H. NETHERWOOD  3,513,358
CAPACITOR HAVING UNIFORMLY RESISTIVE ELECTROLYTE
AND SEPARATOR MATERIAL BETWEEN ELECTRODES
Filed Oct. 27, 1967

United States Patent Office 3,513,358
Patented May 19, 1970

3,513,358
CAPACITOR HAVING UNIFORMLY RESISTIVE ELECTROLYTE AND SEPARATOR MATERIAL BETWEEN ELECTRODES
Paul H. Netherwood, Williamstown, Mass., assignor to Sprague Electric Company, North Adams, Mass., a corporation of Massachusetts
Filed Oct. 27, 1967, Ser. No. 678,680
Int. Cl. H01g 9/02
U.S. Cl. 317—230   7 Claims

ABSTRACT OF THE DISCLOSURE

A semiresistive material having electronic conductivity is utilized as a separator between a cathode electrode and a filmed valve metal electrode in the presence of an electrolyte to provide an electrolytic capacitor having relatively uniform resistance parameters over a wide temperature range.

BACKGROUND OF THE INVENTION

This invention relates to electrolytic capacitors and more particularly to electrolytic capacitors having uniform resistance characteristics over a wide temperature range.

Electrolytic capacitors of the prior art, generally utilize the ionic conductivity of the electrolyte to provide a resistive connection between the cathode and filmed anode of the unit so that the electrolyte not only supplies film forming or healing capability of the device but also provides sufficient cathode-anode resistance which limits the current to a suitable healing value.

In some cases, the resistivity has also been enhanced by ionic conduction of the cathode-anode spacer. In either case, however, since ionic conductivity varies widely with temperature, the resistance parameters of the component, for example the equivalent series resistance (ERS) and the resistance-capacitance or RC figure vary widely with temperature and seriously impair capacitor operation, especially at low ambient temperature.

It is an object of this invention to provide an electrolytic capacitor wherein the resistive cathode to anode connection primarily utilizes electronic conduction.

It is another object of the invention to provide an electrolytic capacitor having relatively uniform resistance parameters over a wide temperature range.

It is a further object of this invention to provide an electrolytic capacitor having a semiresistive spacer which provides electronic conduction between electrodes and relatively uniform resistivity over a wide temperature range.

These and other objects of the invention will be apparent from the following description and claims taken in conjunction with the accompanying drawing.

SUMMARY OF THE INVENTION

Broadly, an electrolytic capacitor constructed in accordance with the invention comprises a film forming electrolyte, an anodized valve metal electrode, and a semiresistive material having electronic conductivity, said material in electrical contact with the anodic film of said electrode in the presence of said electrolyte and in electrical contact with a cathode terminal.

In a more limited sense, an electrolytic capacitor provided in accordance with the invention comprises a film forming electrolyte, a plurality of electrodes, at least one of said electrodes being an anodized valve metal electrode, and semiresistive material having electronic conductivity, said electrodes and said material being alternately arranged and convolutely wound in a capacitive section which is saturated with said electrolyte.

DESCRIPTION OF THE PREFERRED EMBODIMENT

Figure 1:
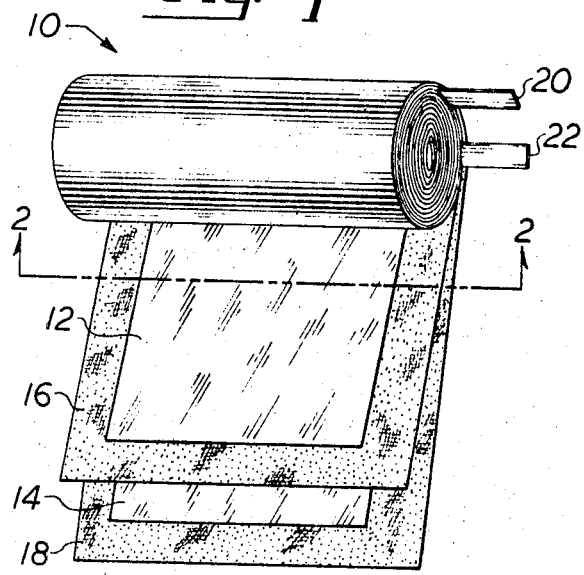
FIG. 1 is a perspective view of a partially unrolled electrolytic capacitor constructed in accordance with the invention; and, FIG. 2 is a cross section of this invention taken along line 2—2 of FIG. 1.
Figure 2:
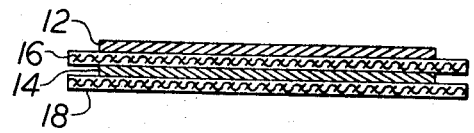

In the drawing, a capacitance section 10 is shown in partly unrolled condition illustrating its layer construction wherein electrodes 12 and 14 are separated by spacer layers 16 and 18. Anode 12 is a filmed valve metal of aluminum or tantalum or the like and cathode 14 is valve metal, or non-valve metal such as silver or the like.

Spacers 16 and 18 which separate the electrodes are semiresistive layers of carbonaceous material such as carbon paper or the like which function to provide a low resistance by electronic conduction between electrodes. Section 10 is impregnated with an electrolyte such as a solution of ammonium pentaborate in ethylene glycol or the like, and tabs 20 and 22, connected to electrodes 12 and 14 respectively, function as terminals of the capacitance section.

In this construction, conductance from anode to cathode is primarily due to the electronic conduction of spacers 16 and 18. This provides relatively uniform resistance characteristics over a wide temperature range since electronic conductors generally have a more uniform temperature coefficient of resistivity than do ionic conductors. Of course, the electrolyte does contribute to the overall resistance of the section, however its resistive contribution should be minimized in this construction. Hence the separators need not be permeated with the electrolyte but need only retain a surface coating of it in the film area sufficient for self healing.

Advantageously, the electrolyte does insure a low interface resistance between the conductive spacer and the anodic film in the described construction. However, this interface contribution may also be unnecessary in some embodiments where the semi-resistive material is made to closely conform to the anodized valve metal surface and provides a semi-wet interface; as for example, where the separator is in the form of a paste, such as Aquadag or the like.

In the preferred embodiment, carbon paper is utilized as the separator paper. This paper is of the type in which one of the more conductive forms of carbon, such as carbon black or graphite or the like is mixed with cellulose or similar fibers in the paper pulp and distributed throughout the final paper product.

Consequently, the spacer of this embodiment is a composite of conductive and insulative material. However, its overall resistance is due primarily to the electronic conduction of the carbon. Spacers of pure carbon black or graphite would also be useful. In addition, paper material formed of carbonized fibers may be suitable.

It should be understood that the semiresistive spacer must continue to provide a suitable resistance throughout the life of the unit and thus, should be of material, such as carbon, which does not form surface compounds (oxides or the like) having lower conductivity than the material itself.

For proper anode-cathode resistance, that is equal to the resistance of conventional electrolyte units at 25° C., it is preferred that the spacer material have a resistivity of approximately $2 \times 10^7$ ohm-cm. at .67 volt per mil and $7 \times 10^7$ ohm-cm. at 60 volts per mil as measured between flat contacts of 2 inch diameter at 23° C. and 50% humidity in accordance with ASTM standards D149, Table 1, for measuring of volume resistivity of sheet and film material.

As an example of the improved device an electrolytic capacitor was constructed with .005 inch thick carbon paper having a resistivity of $6.4 \times 10^7$ and $2.1 \times 10^8$ ohm-cm. at .67 and 60 volts per mil respectively. Etched and formed aluminum foil .003 inch thick was employed as the anode while etched aluminum .002 inch thick was utilized as the cathode. The electrodes and conductive spacers were convolutely wound together and saturated with a glycol-borate type electrolyte. These were then compared to units of similar construction which employed spacers of conventional Manila hemp paper. Comparative values of the resistance capacitance (RC) figure at various ambient temperatures and change in equivalent series resistance ($\Delta$ESR) were as follows:

TABLE I

|  | RC at −55°C. | RC at −40°C. | RC at 25°C. | RC at 85°C. |
| --- | --- | --- | --- | --- |
| 0 volts: |  |  |  |  |
| Carbon Paper Unit | 2,100 | 1,480 | 211 | 85 |
| Manila Hemp Paper Unit | 8,055 | 2,972 | 85 | 55 |
| 50 Volts: |  |  |  |  |
| Carbon Paper Unit | 1,493 | 956 | 92 | 50 |
| Manila Hemp Paper Unit | 3,752 | 1,144 | 48 | 39 |

TABLE II

|  | $\Delta$ESR from 25° C. to −55° C. | $\Delta$ESR from 25° C. to −40° C. |
| --- | --- | --- |
| 0 Volts: |  |  |
| Carbon Paper Unit | 24 | 10 |
| Manila Hemp Paper Unit | 388 | 50 |
| 50 Volts: |  |  |
| Carbon Paper Unit | 37 | 10 |
| Manila Hemp Paper Unit | 200 | 30 |

As can be seen from the example, the change in resistance with temperature of the conventional unit is many times greater than that of the resistive spacer unit, especially at low temperatures.

Many semiresistive materials having electronic conductivity may also be useful. The spacer may be constructed of a semi-resistive element or compound, or may be a composite of resistive and insulative materials. Carbon filled plastic films may also be useful; for example, conductive carbon filled polypropylene.

Other modifications are also possible. For example, the resistive spacer may also include or function as the cathode electrode in some units. Thus many different modifications are possible and it should be understood that the invention is not to be limited except as in the appended claims.

What is claimed is:

1. An electrolytic capacitor comprising a film forming ionic conducting electrolyte, an anodized valve metal electrode and a cathode electrode, a semiresistive carbonaceous material having electronic conductivity together with said electrolyte being disposed between said electrodes and in contact with the anodic film of said valve metal electrode, and said electrolyte being in electrical contact with said cathode electrode.

2. A capacitor as claimed in claim 1 wherein said semiresistive material is a coating deposited on an anodized surface of said valve metal.

3. A capacitor as claimed in claim 1 wherein said material comprises carbon black.

4. A capacitor as claimed in claim 1 wherein said material comprises graphite.

5. A capacitor as claimed in claim 1 wherein said semiresistive material is paper having carbon distributed therethrough.

6. A capacitor as claimed in claim 1 wherein said semiresistive material is a spacer between said electrodes.

7. A capacitor as claimed in claim 6 wherein said electrodes are layers convolutely wound in a capacitive section with separating layers of said semiresistive material contacting said anodic film and said cathode electrode.

References Cited

UNITED STATES PATENTS

| 1,918,716 | 7/1933 | Ruben | 317—230 |
| 1,976,700 | 10/1934 | Lilienfeld | 317—230 |
| 1,986,779 | 1/1935 | Lilienfeld | 317—230 |

JAMES D. KALLAM, Primary Examiner

U.S. Cl. X.R.

317—233

PO-1050
(5/69)

UNITED STATES PATENT OFFICE
CERTIFICATE OF CORRECTION

Patent No. __3,513,358__  Dated __May 19, 1970__

Inventor(s) __Paul H. Netherwood__

It is certified that error appears in the above-identified patent and that said Letters Patent are hereby corrected as shown below:

Column 3, line 2, ".005" should read -- .003 --

SIGNED AND SEALED
SEP 1 - 1970

(SEAL)
Attest:

Edward M. Fletcher, Jr.
Attesting Officer

WILLIAM E. SCHUYLER, JR.
Commissioner of Patents